United States Patent
Ristoski et al.

(10) Patent No.: US 9,994,706 B2
(45) Date of Patent: Jun. 12, 2018

(54) INTERNAL MOLD RELEASE AGENT FOR REINFORCED COMPOSITE

(71) Applicant: Dow Global Technologies LLC, Midland, MI (US)

(72) Inventors: Toni Ristoski, Shelby Township, MI (US); David H. Bank, Midland, MI (US); Gary L. Jialanella, Oxford, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days. days.

(21) Appl. No.: 14/909,766

(22) PCT Filed: Aug. 25, 2014

(86) PCT No.: PCT/US2014/052529
§ 371 (c)(1),
(2) Date: Feb. 3, 2016

(87) PCT Pub. No.: WO2015/038319
PCT Pub. Date: Mar. 19, 2015

(65) Prior Publication Data
US 2016/0185951 A1    Jun. 30, 2016

Related U.S. Application Data

(60) Provisional application No. 61/875,739, filed on Sep. 10, 2013.

(51) Int. Cl.
*C08L 63/00* (2006.01)
*C08K 5/101* (2006.01)
*C08J 5/04* (2006.01)
*C08F 290/06* (2006.01)

(52) U.S. Cl.
CPC .......... *C08L 63/00* (2013.01); *C08F 290/064* (2013.01); *C08J 5/04* (2013.01); *C08J 5/042* (2013.01); *C08J 2363/00* (2013.01)

(58) Field of Classification Search
None
See application file for complete search history.

(56) References Cited

U.S. PATENT DOCUMENTS 5,883,193 A * 3/1999 Karim .................... C09J 4/06
525/113
6,348,118 B1 * 2/2002 Johnson ............... C03C 27/048
156/246
2001/0028953 A1    10/2001 Bluem et al.

FOREIGN PATENT DOCUMENTS

EP    0503866 A1    9/1992
GB    2297332 A    7/1996

OTHER PUBLICATIONS

Database WPI 1-6, Week 198436, Thomson Scientific, London, GB; AN 1984-221869, XP002734848, & JP S59 129295 A (Dainippon Ink & Chem KK), Jul. 25, 1984 (Jul. 25, 1984), Abstract.
Database WPI 1-6, Week 200413, Thomson Scientific, London, GB; AN 2004-126027, XP002734849, & JP 2003 212925 A (Mitsubishi Chem Corp), Jul. 30, 2003 (Jul. 30, 2003), Abstract.
Database WPI 1-6, Week 201050, Thomson Scientific, London, GB; AN 2010-J13984, XPQ02734850, & JP 2010 155888 A (Nippon Oils & Fats Co LTD), Jul. 15, 2010 (Jul. 15, 2010), Abstract.

* cited by examiner

*Primary Examiner* — Michael J Feely

(57) ABSTRACT

An acrylic ester containing resin mixture for production of reinforced composite, and the process of making and using the same.

5 Claims, 4 Drawing Sheets wherein R· is growing polymer chain and M is a monomer wherein R· is growing polymer chain and M is a monomer

INTERNAL MOLD RELEASE AGENT FOR REINFORCED COMPOSITE

FIELD OF THE INVENTION

As the automotive industry moves towards more fuel efficient cars, one path to reducing fuel usage is to reduce the vehicle weight. However, the weight needs to be reduced without sacrificing vehicle integrity and safety. Reinforced composites, i.e., carbon fiber composites made from mixing carbon fibers with thermosetting resins, offer a material that is lower density/weight while retaining similar mechanical properties as those of steel and aluminum.

The reinforced composites can be molded into final or semifinal molded parts for automotive assembly. During such molding process, internal mold release ("IMR") agents are typically used to aid the release of the composite from the molding device after the process. There are many known materials that can be used as IMR agents. The selection is dependent on the type of resins used in the composite, the type of molding to be performed, and the temperature of the molding process, etc. Often, the molded part will be painted or adhesively bonded to other components. One challenge with the use of IMR agents is that they can interfere with adhesion properties of the molded parts after the reinforced composite has been molded.

Typically, some pretreatment of the molded parts is needed to improve the adhesion to the other substrate component. For example, in Surface Treatment of Materials for Adhesion Bonding (p. 220) by Sina Ebnesajjad, the author describes the removal of mold release agent present on the surface of thermoset materials by a detergent wash, solvent-wash, or solvent wipe, followed by light sanding. In "Joining: Understanding the Basics" (p. 291) by Flake C. Campbell, the author describes that "Many parts molded from thermosetting materials have a mold-release agent on the surface that must be removed before adhesive bonding can be accomplished." The author described various techniques used to remove the release agents including: washing or wiping with detergent or solvent followed by light sanding and another solvent wipe.

Therefore, there is a need for an IMR agent that works well in releasing the molded part from the molding device and allows the molded part to be adhered to without extensive pretreatment of its surface.

SUMMARY OF THE INVENTION

The present invention provides an acrylic ester as an IMR agent for the molding process of the reinforced composite, such as carbon fiber reinforced composite. The acrylic ester has the ability to copolymerize with free radical type of adhesives and coatings and therefore will not have any negative impact to the adhesion property of the molded composite parts. It is suspected that if the acrylic ester is incorporated or otherwise chemically bonded into the backbone of the adhesive or coating materials, it will no longer be at the interface of the molded parts acting as a weak boundary layer between the adhesive/coating and the molded part.

DETAILED DESCRIPTION OF THE INVENTION

The present invention provides acrylic esters, as shown below in Formula I, as IMR agents for the molding process of the reinforced composite, such as carbon fiber reinforced composite. The preferred acrylic esters used in the present invention will have a C number above 12. These include $C_{13}$-tridecyl acrylate (SR 489 available from Sartomer), $C_{14}$-tetradecyl acrylate and $C_{16}$-hexadecyl acrylate both available from TCI America, $C_{18}$-stearyl acrylate (SR 257 available from Sartomer.

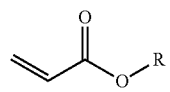

Formula I

Where R is a hydrocarbon chain with greater than 12 carbons

Figure 1:
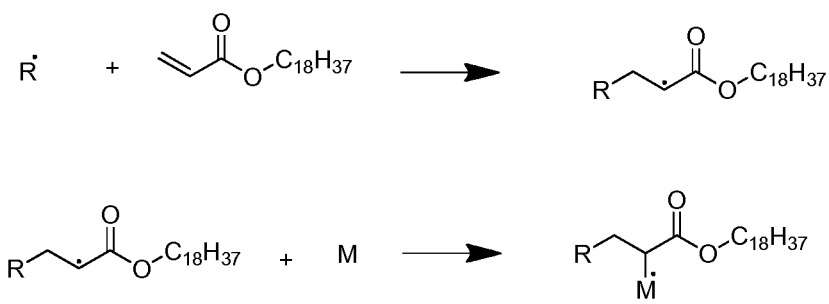
FIG. 1 illustrates the suspected incorporation of acrylic ester into the backbone of the adhesive or coating resins when the resins are applied to the surface of the molded parts.

It is suspected that the acrylic ester of Formula 1 is incorporated into or otherwise chemically bonded with the backbone of the adhesive or coating applied to the molded part, and hence no longer at the interface acting as a weak boundary layer between the adhesive/coating and the molded composite. An example of this backbone incorporation is illustrated in FIG. 1.

In the present invention, the IMR agents are typically mixed first with the resin composition. The IMR containing resin compositions are then mixed with carbon fibers and molded into molded parts.

The resin composition used in the present invention may comprise solid epoxy resin, liquid epoxy resin, epoxy novolac resin, or a mixture thereof. In preferred embodiments of the present invention, the resin composition comprises (all weight percentages are based on total weight of the resin composition): 40 to 70 wt % and preferably 45 to 60 of a solid epoxy resin, 0 to 20 wt % and preferably 5 to 15 of a liquid epoxy resin, 15 to 35 wt % and preferably 20 to 30 of epoxy novolac resin, 5 to 10 wt % and preferably 6 to 8 of a curing agent, and 1 to 8 wt % and preferably 2 to 6 of a catalyst. In one preferred embodiment, the resin composition comprises:

53.6 wt % of DER™ 6508 (solid epoxy resin available from The Dow Chemical Company);

8.9 wt % of DER™ 331 (liquid epoxy resin available from The Dow Chemical Company);

26.8 wt % of DEN™ 438 (epoxy novolac resin available from The Dow Chemical Company);

7.0 wt % of Amicure™ CG 1200 (dicyandiamide curing agent available from Air Products); and 3.7 wt % of Omicure™ 410M (aromatic substituted urea accelerator available from Emerald Performance Materials).

The resin components can be mixed together into one mixture with the curing agent and catalyst or the curing agent and catalyst can be incorporated into the resin mixture at the same time with the reinforcing fibers. Reinforcing fibers that can be used in the present invention include glass fibers, carbon fibers, and aramid fibers.

In some embodiments, the resin composition may further contain additives, catalysts, curing agents, thickeners, diluents, wetting agents, impact modifiers and fillers.

Acrylic esters of the present invention may be mixed with the resin composition in any known methods. Acrylic esters can be pre heated at about 35° C. to melt into a liquid and added into the resin composition during any of the mixing steps. After the mixing of IMR agents with the resin composition, the mixture typically contains, based on the total weight of the mixture, more than 0.1 wt. %, preferably more than 1.0 wt. % and more preferably more than 3.0 wt % of acrylic esters of Formula 1.

In addition to acrylic esters of Formula 1, the IMR agents of the present invention may also include other known conventional internal molding release chemicals. These include long chain fatty acids, fatty acid salts, fatty acid esters, amide waxes and mixtures of fatty acids, amines and esters. Commercially available examples of known IMR's include stearic acid, zinc stearate, calcium stearate, proprietary mixtures from Axel Plastics Laboratories sold under the Mold Wiz name brand and proprietary mixtures from Rexco Mold Care sold under the Marbalease IMR name brand. In a typical embodiment when both an acrylic ester of Formula 1 IMR agent and other conventional IMR agents are used, the other conventional IMR agents are used in less than 10 wt % and preferably in less than 5%.

Once the IMR agents are added to the resin composition, the mixture is ready to be processed to include the reinforcement materials, such as carbon fiber, and to be molded. The mixture will typically contain 10 to 80% of fibers, preferably, 30 to 70 wt % fibers, based on the total weight of the mixture. Alternatively, the IMR agents may be added to the resin composition at the same time with the addition of reinforcement materials.

The present invention is further illustrated with the following non-limiting examples.

Sample Preparation:

Epoxy containing resin compositions were prepared in a plastic cup using a FlackTek speed mixer. The following resin composition was prepared by the procedure outlined below:

| Component | Weight (g) |
|---|---|
| DEN 438 (Epoxy novolac resin) | 30 |
| DER 6508 (Solid epoxy resin) | 60 |
| DER 331 (Liquid epoxy resin) | 10 |
| Acetone | 30 |
| Amicure CG1200 (Dicyandiamide curing agent) | 7.8 |
| Omicure 410M (Aromatic substituted urea accelerator) | 4.1 |
| Total weight | 141.9 |

The composition was made by adding the solid epoxy resin and acetone to the speed mixer cup. The mixture was mixed for 2 minutes at a time at 1,500 rpm, repeating the process until the solid epoxy is dissolved. The rest of the raw materials were added, including the liquid epoxy resins, curing agent and accelerator and mixed for 2 minutes at 1,500 rpm to make a master batch of resin composition. Four speed mixer cups were filled with 30 g of the master batch described above and to each of the four cups 1 g of one of the following compounds was added:

Zinc stearate
Stearyl acrylate (SR 257 from Sartomer)
Stearyl methacrylate (SR 324 from Sartomer)
Lauryl acrylate (SR 335 from Sartomer)

Once each IMR was added, the resin composition material was mixed for 2 minutes at 1,500 rpm. Each material was then applied to strips of carbon fiber woven fabric provided by DowAksa Ileri Kompozit Malzemeler Sanayi Limited Sirketi. The strip of woven carbon fiber fabric was placed on top of release paper and the resin composition was applied on the top side with a tongue depressor, spread evenly over the fabric using the tongue depressor going back and forth until uniform coverage is achieved and the excess removed. Once one side of the fabric was evenly coated, the strip was flipped over on the release paper and the same procedure was repeated on the other side. The composite thus made should contain about 60 wt % carbon fiber. The coated strips were left in the hood over night to allow all of the solvent to evaporate before any testing was conducted. Once the solvent evaporates out, these strips become tack free prepregs that will be used for further testing.

Figure 2:
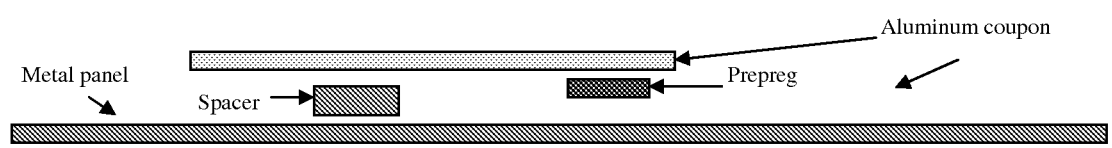
FIG. 2 illustrates the aluminum lap shear set up for heated press test.

Aluminum Lap Shear Test:

To screen the effectiveness of each mold release, candidate lap shears were made using aluminum as the substrate and the strips of carbon fiber composite as the adhesive. The aluminum used was Aluminum 6061 cut into 4×1 in strips which were cleaned with isopropyl alcohol to prevent interference in the results from contamination. This was achieved by cutting the strips of prepreg prepared in a previous step into 20×20 mm squares as shown below in FIG. 2, stacking 2 squares of prepreg on top of each other and placing them between the aluminum substrate. The aluminum lap shears were placed on a 12×12 in metal panel with a spacer keeping the top coupons above the bottom ones.

Nine lap shears were set up side by side on the metal panel making three lap shears for each IMR to be screened, the three lap shears were spread on the panel to reduce the possible impact of temperature variation that may occur from the center of the press to the edges. The setup described in FIG. 1 was then placed in a heated press that was preheated to 150° C. A force of 5 metric tons was applied and kept for 10 minutes while the composite cured. At the end of the 10 minutes the panel was removed from the press and the lap shears were allowed to cool to room temperature prior to testing.

The lap shears were tested using an Instron to measure the force required to separate the two substrates in shear. The testing was conducted at 23° C./50% relative humidity and the samples were pulled apart at 12 mm/min. The break strength of each sample was recorded.

Figure 3:
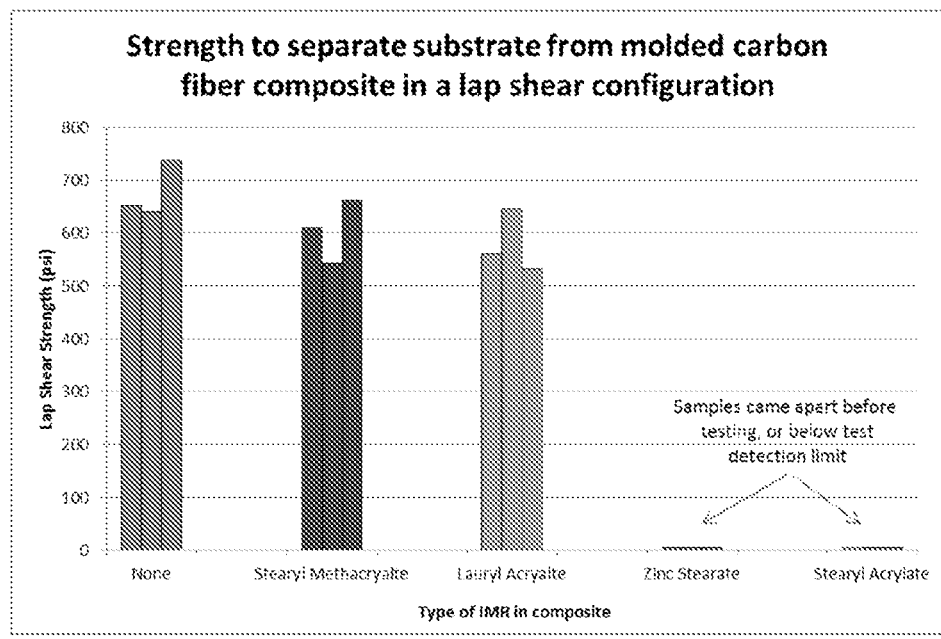
FIG. 3 is a lap shear configuration using carbon fiber composites with various IMR's as the adhesive and aluminum 6061 as the adherent.

FIG. 3 shows the data for lap shears prepared and tested by the method described above, with the variable being the type of mold release agent incorporated into the resin composition. The data shows that zinc stearate and stearyl acrylate exhibited excellent release properties, while stearyl methacrylate and lauryl acrylate showed an insignificant reduction in the adhesion strength.

Carbon Fiber Composite Substrate Preparation:

The following resin compositions were prepared using the procedure described below:

| Component | weight (g) |
|---|---|
| DEN 438 | 30 |
| DER 6508 | 60 |
| DER 331 | 10 |

-continued

| Component | weight (g) |
| --- | --- |
| Acetone | 30 |
| Amicure CG1200 | 7.8 |
| Omicure 410M | 4.1 |
| Total weight | 141.9 |

This resin composition was then divided into 2 speed mixer cups containing 70 g each. Six cups containing 70 g each of this resin formulation were prepared. To two of those cups 40 g of AKSACA Carbon Fiber AC3101 were added and mixed for 2 minutes at 1500 rpm, these were then molded into plaques as described in the procedure below and marked as the control substrate that does not contain any IMR. To the next 2 cups, 2 g of zinc stearate was added to each cup along with 40 g of AKSACA Carbon Fiber AC3101, the molded plaques from these formulations were marked as containing zinc stearate as an IMR. To the final 2 cups, 2 g of stearyl acrylate (SR 257) were added along with 40 g of AKSACA Carbon Fiber AC3101, the molded plaques from these formulations were marked as containing stearyl acrylate as an IMR.

The resin compositions were prepared in a plastic cup using a FlackTek speed mixer. The formulations were made by adding the solid epoxy resin and acetone to the speed mixer cup. Mixing for 2 minutes at a time at 1,500 rpm, repeating the process until the solid epoxy is dissolved. The rest of the raw components were added, including the liquid epoxy resins, curing agent and accelerator and mixed for 2 minutes at 1,500 rpm. To 70 g of the resin/solvent mixture, 40 g of chopped carbon fiber were added and mixed for 2 minutes at 1500 rpm. Once the fibers were homogeneously distributed in the resin/solvent mixture, the material was placed on release paper inside a hood for at least 24 hours to allow the solvent to evaporate. Once the solvent evaporates, the material was placed in an oven at 90° C. for 10 minutes to soften the material prior to molding. Once soft, the material was compacted down, placed between 2 sheets of Teflon coated paper and placed in a heated press set at 150° C. with 3 mm spacers. The material was compressed with a force of about 10,000 lbs and held at that pressure and temperature for 10 minutes. The size of the molded plaques was about 6×6 in. These plaques were then cut into 1×4 in strips that were used as coupons to make adhesively bonded lap shears.

Lap shears were made using coupons prepared by the method described above that incorporated zinc stearate as an IMR in one set, stearyl acrylate as IMR in another set and a control with no IMR included in a third set. There was no surface treatment done on the coupons other than a dry wipe with a microfiber rag. The adhesion test results for these lap shears are listed in FIG. 4.

Figure 4:
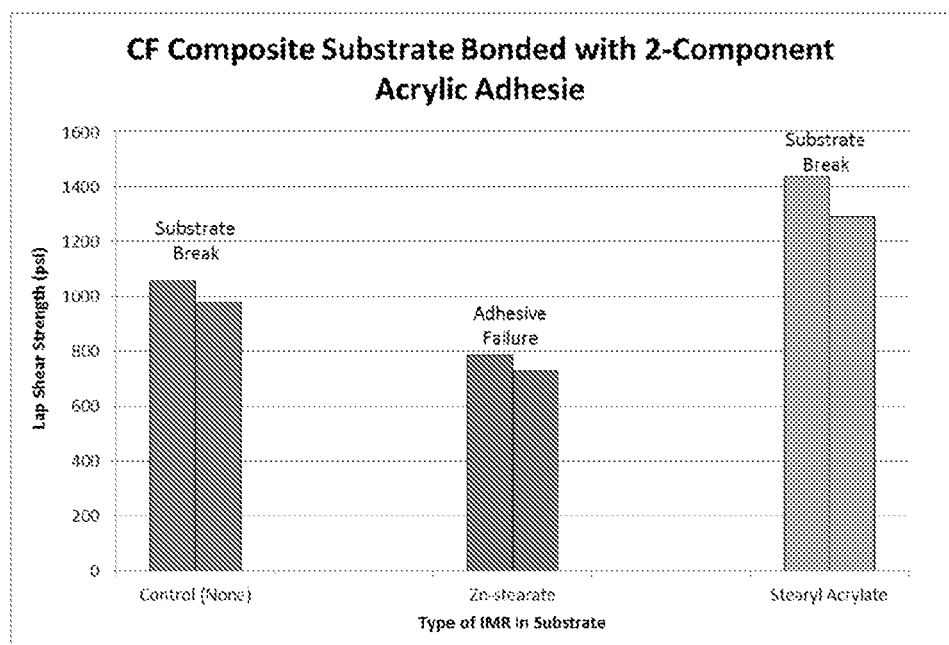
FIG. 4 is a lap shear configuration with a 2-component acrylic adhesive bonded to carbon fiber composite substrate molded with various IMR's.

As can be seen in FIG. 4, the adhesion was negatively impacted by the presence of zinc stearate in the substrate. Not only are the strength values reduced, but, the failure mode is changed from a substrate break to an unacceptable adhesive failure mode. However, when stearyl acrylate is used, not only is there no reduction in strength, but, the failure mode remains substrate break, even though stearyl acrylate exhibited the same excellent release properties as zinc stearate.

The invention claimed is:

1. A mixture of epoxy resin composition, fibers, and an internal molding release agent, wherein the internal molding releasing agent is an acrylic ester with a chemical structure of Formula I:

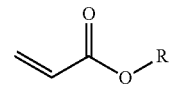

wherein R is a hydrocarbon chain with greater than 12 carbons; and wherein the mixture further comprising one or more selected from long chain fatty acids, fatty acid salts, fatty acid esters, amide waves and mixtures of fatty acids, amines and esters.

2. The mixture according to claim 1 wherein R is a hydrocarbon chain with 13 to 18 carbons.

3. The mixture according to claim 1 comprising more than 0.1 wt %, based on the total weight of the mixture, of acrylic ester of Formula 1.

4. The mixture according to claim 3 comprising more than 1 wt %, based on the total weight of the mixture, of acrylic ester of Formula 1.

5. The mixture according to claim 4 comprising more than 3 wt %, based on the total weight of the mixture, of acrylic ester of Formula 1.

* * * * *